(12) United States Patent
Korolev et al.

(10) Patent No.: US 12,493,315 B2
(45) Date of Patent: Dec. 9, 2025

(54) ETHERNET-APL FIELD DEVICE HAVING REDUCED ENERGY CONSUMPTION

(71) Applicant: Rosemount Inc., Shakopee, MN (US)

(72) Inventors: Yevgeny Korolev, Maple Grove, MN (US); Brian Alan Franchuk, Red Wing, MN (US)

(73) Assignee: ROSEMOUNT INC., Shakopee, MN (US)

( * ) Notice: Subject to any disclaimer, the term of this patent is extended or adjusted under 35 U.S.C. 154(b) by 18 days.

(21) Appl. No.: 18/650,616

(22) Filed: Apr. 30, 2024

(65) Prior Publication Data

US 2025/0334989 A1  Oct. 30, 2025

(51) Int. Cl.
 H04B 1/38 (2015.01)
 G05F 1/66 (2006.01)
 H02J 1/08 (2006.01)

(52) U.S. Cl.
 CPC . *G05F 1/66* (2013.01); *H02J 1/08* (2013.01)

(58) Field of Classification Search
 CPC ................................... G05F 1/66; H02J 1/08
 USPC ........................................ 375/219, 295, 316
 See application file for complete search history.

(56) References Cited

U.S. PATENT DOCUMENTS

| | | |
|---|---|---|
| 1,860,904 A | 5/1932 | Remington |
| 1,981,545 A | 11/1934 | Hammerling |
| 2,855,579 A | 10/1958 | Wintriss |
| 2,955,352 A | 10/1960 | Wintriss |
| 3,696,364 A | 10/1972 | Lavelle |
| 3,706,957 A | 12/1972 | Iantorno |
| 3,737,609 A | 6/1973 | Overkott |
| 4,841,777 A | 6/1989 | Hershey et al. |
| 5,193,846 A | 3/1993 | Allard |
| 5,436,788 A | 7/1995 | Wallaert |
| 5,554,809 A | 9/1996 | Tobita et al. |
| 5,656,782 A | 8/1997 | Powell, II et al. |
| 5,798,910 A | 8/1998 | Holbeche et al. |

(Continued)

FOREIGN PATENT DOCUMENTS

| | | |
|---|---|---|
| CN | 1375110 A | 10/2002 |
| CN | 1914701 A | 2/2007 |

(Continued)

OTHER PUBLICATIONS

Communication Pursuant to Rules 161(1) and 162 EPC from European Patent Application No. 19705438.0, dated Oct. 20, 2020.

(Continued)

*Primary Examiner* — Zewdu A Kassa
(74) *Attorney, Agent, or Firm* — Westman, Champlin & Koehler, P.A.

(57) ABSTRACT

A field device for an industrial process includes field device circuitry, an APL communication circuit, and a power circuit. The power circuit includes a power regulator configured to regulate DC power that powers the field device circuitry and the APL communication circuit, a main power sensor configured to generate a main power signal that corresponds to the DC power, a voltage shunt regulator configured to divert excess power to a circuit common, and an excess power sensor configured to generate an excess power signal that corresponds to a magnitude of the excess power. The power regulator adjusts the DC power based on the main power signal and the excess power signal.

20 Claims, 6 Drawing Sheets

(56) References Cited

U.S. PATENT DOCUMENTS

| | | |
|---|---|---|
| 5,937,758 A | 8/1999 | Maracas et al. |
| 6,047,220 A | 4/2000 | Eryurek |
| 6,050,145 A | 4/2000 | Olson et al. |
| 6,382,448 B1 | 5/2002 | Yuhara et al. |
| 6,422,532 B1 | 7/2002 | Garner |
| 6,457,367 B1 | 10/2002 | Behm et al. |
| 6,487,912 B1 | 12/2002 | Behm et al. |
| 6,568,266 B1 | 5/2003 | Desa et al. |
| 6,813,132 B1 | 11/2004 | Mitlmeier et al. |
| 7,035,773 B2 | 4/2006 | Keyes, IV et al. |
| 7,447,612 B2 | 11/2008 | Keyes, IV et al. |
| 7,458,275 B2 | 12/2008 | Kleven et al. |
| 7,848,906 B2 | 12/2010 | Keyes, IV et al. |
| 7,956,738 B2 | 6/2011 | Karschnia et al. |
| 8,049,361 B2 | 11/2011 | Kielb et al. |
| 8,145,180 B2 | 3/2012 | Brown et al. |
| 8,160,535 B2 | 4/2012 | Kielb et al. |
| 8,299,938 B2 | 10/2012 | Hedtke |
| 8,334,788 B2 | 12/2012 | Hausler et al. |
| 8,355,234 B2 | 1/2013 | Nilman-Johansson et al. |
| 8,538,560 B2 | 9/2013 | Brown et al. |
| 8,538,732 B2 | 9/2013 | Keyes, IV et al. |
| 8,626,087 B2 | 1/2014 | Vanderaa |
| 8,694,060 B2 | 4/2014 | Vanderaa et al. |
| 8,776,608 B2 | 7/2014 | Hedtke et al. |
| 8,787,848 B2 | 7/2014 | Kielb et al. |
| 8,847,571 B2 | 9/2014 | Kielb |
| 8,929,948 B2 | 1/2015 | Vanderaa et al. |
| 9,089,049 B2 | 7/2015 | Perrault et al. |
| 9,117,609 B2 | 8/2015 | Kodama |
| 9,159,512 B2 | 10/2015 | Kodama et al. |
| 9,261,385 B2 | 2/2016 | Loeffel et al. |
| 9,473,050 B2 | 10/2016 | Park |
| 9,674,976 B2 | 6/2017 | Strei et al. |
| 9,971,316 B2 | 5/2018 | Jia et al. |
| 10,102,985 B1 | 10/2018 | Pelletier et al. |
| 10,217,573 B2 | 2/2019 | Glosser et al. |
| 10,701,820 B1 | 6/2020 | Jacobs et al. |
| 10,915,084 B2 | 2/2021 | Wienhold et al. |
| 11,513,018 B2 | 11/2022 | Holm et al. |
| 12,218,775 B2 | 2/2025 | Schnaare et al. |
| 2002/0149371 A1 | 10/2002 | Grassmann |
| 2003/0085200 A1 | 5/2003 | Rosenkrans et al. |
| 2003/0171827 A1 | 9/2003 | Keyes, IV et al. |
| 2004/0047114 A1 | 3/2004 | Turner et al. |
| 2005/0168891 A1 | 8/2005 | Nilman-Johansson et al. |
| 2006/0142875 A1 | 6/2006 | Keyes, IV et al. |
| 2006/0274493 A1 | 12/2006 | Richardson et al. |
| 2008/0157235 A1 | 7/2008 | Rogers et al. |
| 2009/0062931 A1 | 3/2009 | Keyes, IV et al. |
| 2010/0181179 A1 | 7/2010 | Bou et al. |
| 2010/0258331 A1 | 10/2010 | Dahlgren et al. |
| 2011/0134973 A1 | 6/2011 | Keyes, IV et al. |
| 2012/0111596 A1 | 5/2012 | Mortun et al. |
| 2013/0335174 A1 | 12/2013 | Kodama et al. |
| 2014/0002945 A1 | 1/2014 | Kodama |
| 2015/0002753 A1 | 1/2015 | Perrault et al. |
| 2015/0115863 A1 | 4/2015 | Park |
| 2015/0155111 A1 | 6/2015 | Kondrus |
| 2015/0208538 A1 | 7/2015 | Clarke et al. |
| 2015/0369684 A1 | 12/2015 | Nguyen et al. |
| 2016/0069765 A1 | 3/2016 | Ishikawa et al. |
| 2016/0092386 A1 | 3/2016 | Sakamoto |
| 2016/0109871 A1 | 4/2016 | Phillips |
| 2016/0241011 A1 | 8/2016 | Onishi |
| 2016/0377306 A1 | 12/2016 | Drees et al. |
| 2017/0178825 A1 | 6/2017 | Glosser et al. |
| 2018/0024195 A1 | 1/2018 | Takamura et al. |
| 2018/0070468 A1 | 3/2018 | Yanagisawa et al. |
| 2018/0275006 A1 | 9/2018 | Osawa et al. |
| 2018/0283972 A1 | 10/2018 | Osawa et al. |
| 2019/0029121 A1 | 1/2019 | Gaertner, II |
| 2019/0044325 A1 | 2/2019 | Wilson et al. |
| 2019/0066938 A1 | 2/2019 | Ishida et al. |
| 2019/0138995 A1 | 5/2019 | Currin et al. |
| 2019/0253544 A1 | 8/2019 | Hu et al. |
| 2019/0286965 A1 | 9/2019 | Lovell et al. |
| 2020/0063884 A1 | 2/2020 | Hurd |
| 2020/0103386 A1 | 4/2020 | Lindsey et al. |
| 2020/0371572 A1 | 11/2020 | Plank et al. |
| 2021/0081346 A1 | 3/2021 | Nixon et al. |
| 2021/0083472 A1 | 3/2021 | Graber et al. |
| 2021/0148778 A1 | 5/2021 | Stopel et al. |
| 2021/0157198 A1 | 5/2021 | Hu et al. |
| 2021/0226822 A1 | 7/2021 | Graber et al. |
| 2021/0356346 A1 | 11/2021 | Hidaka et al. |
| 2021/0360809 A1 | 11/2021 | Ahn et al. |
| 2022/0078252 A1 | 3/2022 | Nixon et al. |
| 2022/0319791 A1 | 10/2022 | Geppert et al. |
| 2023/0318875 A1 | 10/2023 | Swarr et al. |
| 2023/0324871 A1 | 10/2023 | Strütt et al. |
| 2024/0056320 A1 | 2/2024 | Swarr et al. |
| 2024/0129145 A1 | 4/2024 | vom Stein |
| 2024/0204510 A1 | 6/2024 | Korolev et al. |
| 2024/0205041 A1* | 6/2024 | Schnaare ............ H04L 12/2801 |

FOREIGN PATENT DOCUMENTS

| | | | |
|---|---|---|---|
| CN | 101718842 A | | 6/2010 |
| CN | 102169162 A | | 8/2011 |
| CN | 103443895 A | | 12/2013 |
| CN | 104396138 A | | 3/2015 |
| CN | 205533544 U | | 8/2016 |
| CN | 106471595 A | | 3/2017 |
| DE | 102020123409 | | 3/2022 |
| EP | 0 948 759 A1 | | 10/1999 |
| EP | 2 063 278 A1 | | 5/2009 |
| FR | 2167150 A5 | | 8/1973 |
| GB | 1402740 A | | 8/1975 |
| JP | H01-166425 A | | 6/1989 |
| JP | H04-102127 A | | 9/1992 |
| JP | 2009-110546 A | | 5/2009 |
| JP | 2012-199115 A | | 10/2012 |
| WO | 2020120058 A1 | | 6/2020 |
| WO | 2022182727 | | 9/2022 |
| WO | 2022182771 A1 | | 9/2022 |
| WO | 2022182771 A4 | | 10/2022 |

OTHER PUBLICATIONS

Notification of Transmittal of the International Search Report and the Written Opinion of the International Searching Authority, from PCT/US2021/033067, dated Sep. 9, 2021.

U.S. Patent Office issued prosecution for U.S. Appl. No. 17/039,222, filed Sep. 30, 2020, including: Notice of Allowance and Fees Due (PTOL-85) and Examiner Initiated Interview Summary issued Jul. 25, 2022, 9 pages; Non-Final Rejection issued Apr. 8, 2022, 17 pages; 26 pages total.

U.S. Appl. No. 18/084,057, filed Dec. 19, 2022.

Notification of Transmittal of the International Search Report and the Written Opinion of the International Searching Authority from PCT/US2023/074338, dated Jan. 2, 2024.

Notification of Transmittal of the International Search Report and the Written Opinion of the International Searching Authority from PCT/US2023/083050, dated Mar. 26, 2024.

US Office Action from U.S. Appl. No. 18/084,057, dated May 23, 2024.

U.S. Appl. No. 18/084,068, filed Dec. 19, 2022.

Notification of Transmittal of the International Search Report and the Written Opinion of the International Searching Authority from PCT/US2025/019310, dated May 27, 2025.

Office Action from U.S. Appl. No. 18/084,068, dated Mar. 5, 2025.

E-Direct Produktkatalog 2016-2017, Endress+Hauser, Part 1, Jan. 1, 2016, pp. 1-84.

E-Direct Produktkatalog 2016-2017, Endress+Hauser, Part 2, Jan. 1, 2016, pp. 85-168.

E-Direct Produktkatalog 2016-2017, Endress+Hauser, Part 3, Jan. 1, 2016, pp. 169-180.

Notification of Transmittal of the International Search Report and the Written Opinion of the International Searching Authority, from PCT/US2019/015556, dated Apr. 18, 2019.

(56) References Cited

OTHER PUBLICATIONS

Product Data Sheet, Rosemount 2120 Level Switch-Vibrating Fork, 00813-0100-04030, Rev. HC, Dec. 2017, 24 pgs.
U.S. Appl. No. 15/928,449, filed Mar. 22, 2018.
First Office Action, including Search Report, for Chinese Patent Application No. 201810667210.4, dated May 5, 2022, 13 pages.
Second Office Action, including Search Report, for Chinese Patent Application No. 201810667210.4, dated Aug. 26, 2022, 5 pages.
Communication Pursuant to Article 94(3) EPC from European Patent Application No. 19705438.0, dated Oct. 22, 2021.
Notice of Reasons for Rejection (Office Action) from Japanese Patent Application No. 2020-548912, dated Nov. 11, 2021.
U.S. Patent Office issued prosecution for U.S. Appl. No. 15/918,226, filed Mar. 12, 2018, including Corrected Notice of Allowability issued Dec. 1, 2020, Notice of Allowance and Fees Due (PTOL-85) issued Oct. 20, 2020, Final Rejection issued Jul. 28, 2020, Non-Final Rejection issued Mar. 4, 2020, Advisory Action, Examiner Initiated Interview Summary and AFCP Decision issued Nov. 29, 2019, Final Rejection issued Sep. 23, 2019, Non-Final Rejection issued May 16, 2019, 113 pages total.

* cited by examiner

ETHERNET-APL FIELD DEVICE HAVING REDUCED ENERGY CONSUMPTION

FIELD

Embodiments of the present disclosure relate to industrial process control systems and field devices of such systems. More specifically, embodiments of the present disclosure relate to techniques for reducing energy consumption of field devices having Ethernet communications in Advanced Physical Layer (APL) (Ethernet-APL) systems.

BACKGROUND

In industrial settings, control systems are used to monitor and control inventories of industrial and chemical processes, and the like, using process measurement or control field devices. Such field devices may perform conventional field device tasks such as process parameter monitoring and measurements using one or more sensors (e.g., pressure sensor, level sensor, temperature sensor, etc.), and/or process control operations using one or more control devices (e.g., actuators, valves, etc.).

Ethernet-APL systems have been developed to improve field device data communications and safety. Such systems are responsible for the transmission and reception of data between a device (e.g., network interface controller, Ethernet hub, network switch, etc.) and a physical data communication link (e.g., data transmission cable). Ethernet-APL systems follow standards set by the Institute of Electrical and Electronics Engineers (IEEE) and the International Electrotechnical Commission (IEC), which allow for high speed data communications and the delivery of power and communications signals over a 2-wire connection while meeting certain intrinsic safety requirements.

SUMMARY

Embodiments of the present disclosure relate to improved power management of industrial process field devices having an Advanced Physical Layer (APL) communication circuit. One example of the field device includes field device circuitry, an APL communication circuit, and a power circuit. The power circuit includes a power regulator configured to regulate DC power that powers the field device circuitry and the APL communication circuit, a main power sensor configured to generate a main power signal that corresponds to the DC power, a voltage shunt regulator configured to divert excess power to a circuit common, and an excess power sensor configured to generate an excess power signal that corresponds to a magnitude of the excess power. The power regulator adjusts the DC power based on the main power signal and the excess power signal.

Another embodiment of the field device includes a power circuit, field device circuitry, and an APL communication circuit. The power circuit includes a power regulator configured to regulate DC power conducted through a positive DC bus, a main power sensor configured to generate a main power signal that corresponds to the DC power, a voltage shunt regulator configured to divert excess power from the positive DC bus to a circuit common, and an excess power sensor configured to generate an excess power signal that corresponds to a magnitude of the excess power through the power shunt regulator. The field device circuitry is powered by a first portion of the DC power, and the APL communication circuit is powered by a second portion of the DC power. The APL communication circuit includes an analog-to-digital converter configured to convert the excess power signal to a digital value, and an APL controller configured to generate a reference signal based on the digital value. The reference signal corresponds to an excess power value corresponding to the excess power signal when the excess power value meets a first relationship to a threshold value, and the reference signal corresponds to a predefined minimum value, which is different from the excess power value, when the excess power value meets a second relationship to the threshold value. The power regulator controls the DC power based on the reference signal and the main power signal.

Embodiments are also directed to methods of managing power in an industrial process field device. In one embodiment, the field device includes field device circuitry, an APL communication circuit, and a power supply. The power supply includes a power regulator, a voltage shunt regulator, a main power sensor and an excess power sensor. In one example of the method, the field device circuitry and the APL communication circuit are powered using DC power. A main power signal is generated that corresponds to the DC power using the main power sensor. An excess power signal is generated that corresponds to the excess power using the excess power sensor. The DC power is adjusted using the power regulator based on the main power signal and a reference corresponding to the excess power signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
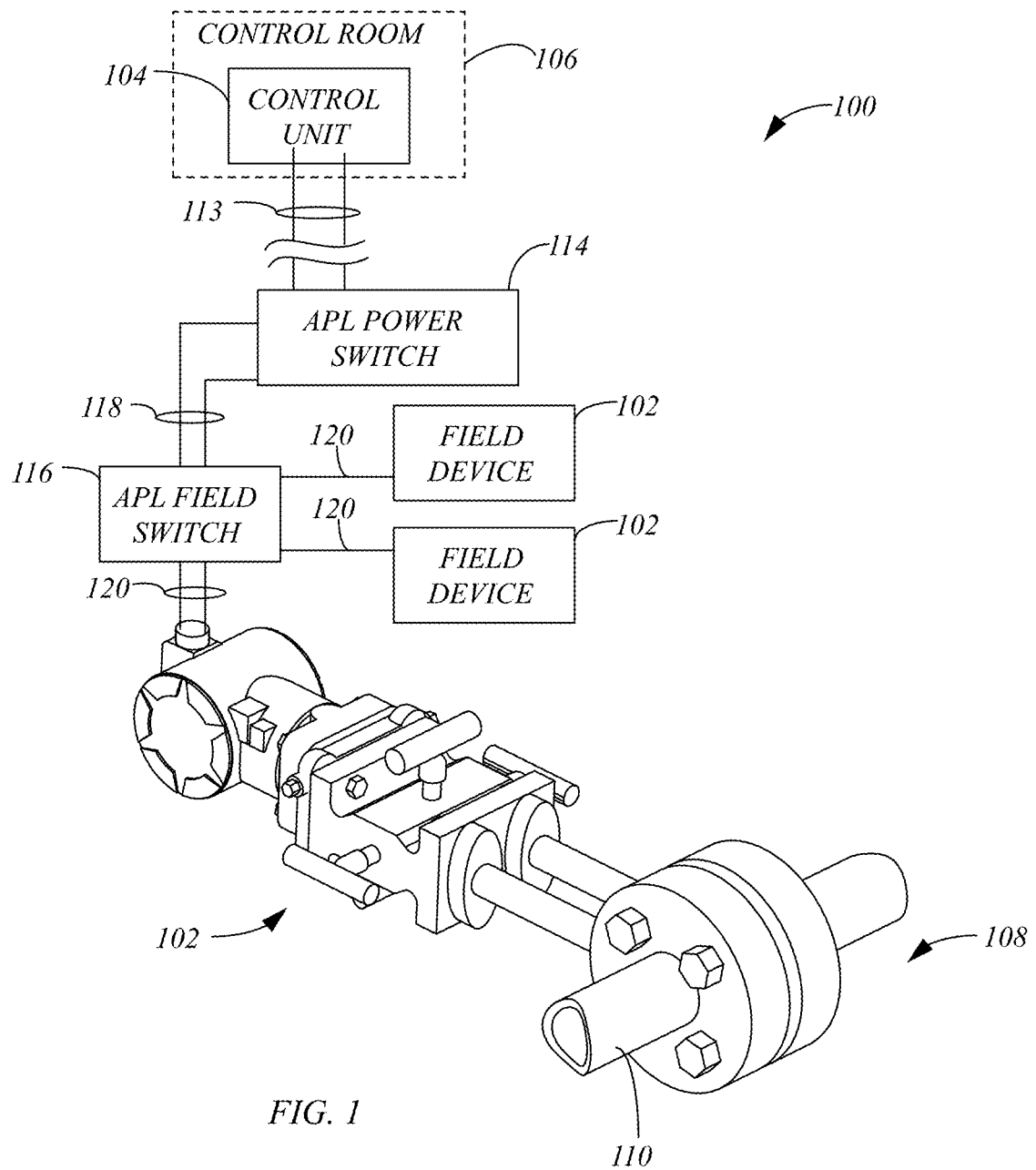
FIG. 1 is a simplified block diagram of an example of a process control or measurement system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 2:
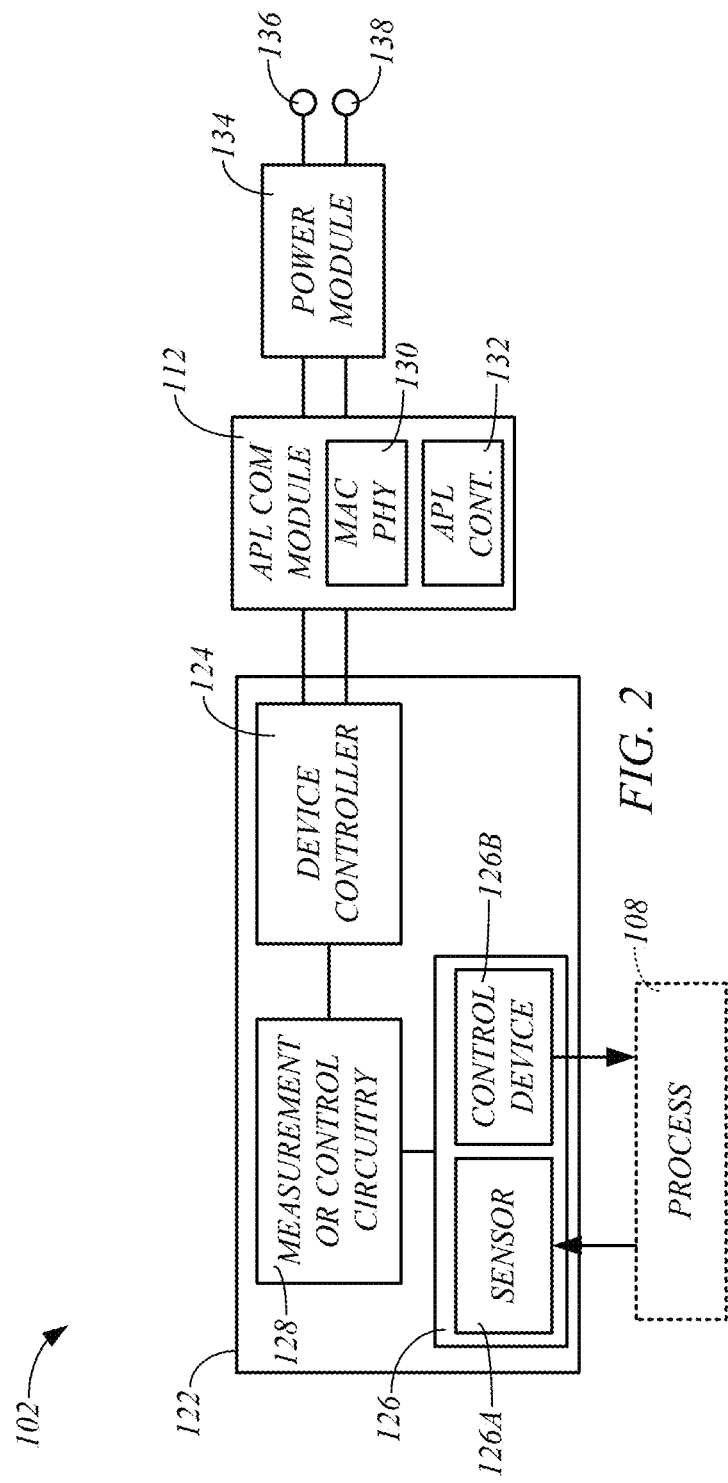
FIG. 2 is a simplified circuit diagram of an example of an industrial process field device, in accordance with the embodiments of the present disclosure.

FIG. 1 is a simplified block diagram of an example of a process control or measurement system 100 that includes a field device 102, in accordance with embodiments of the present disclosure. FIG. 2 is a simplified circuit diagram of an example of an industrial process field device 102, in accordance with the embodiments of the present disclosure.

Each field device 102 communicates with a computerized control unit 104 that interacts with the field device 102. The control unit 104 may be remotely located from the field device 102, such as in a control room 106 of the system 100, as shown in FIG. 1.

The field device 102 may interact with an industrial process 108. In some embodiments, the process 108 involves a material, such as a fluid, transported through pipes, such as pipe 110 (FIG. 1), and/or contained in tanks, for example. The system 100 may perform processes that transform the material from a less valuable state into more valuable and useful products, such as petroleum, chemicals, paper, food, etc. For example, an oil refinery performs industrial processes that can process crude oil into gasoline, fuel oil, and other petrochemicals.

The field device 102 includes an Ethernet communications in Advanced Physical Layer (APL) communication circuit 112 (hereinafter "APL communication circuit") that facilitates conventional Ethernet communications with the control unit 104 over an industrial ethernet 4-wire process control loop 113, such as standard Ethernet wiring (e.g., 10BASE-T1L cable), for example.

The system 100 may include an APL power switch 114, and one or more APL field switches 116 that are connected to the APL power switch 114 through an Ethernet-APL trunk (2-wire) 118. Each APL field switch 116 may power one or more field devices 102 through an APL spur (2-wire) 120. The APL power switch 114 powers the APL field switches 116 and handles data communications with the control unit 104. Each APL field switch 116 powers the corresponding field devices 102 and facilitates communications between the field devices 102 and the APL power switch 114 and control unit 104. The APL power switch 114, the trunk 118, the APL field switch 116, and the APL spurs 120, are formed in accordance with IEEE and IEC Ethernet-APL standards and may comprise conventional components.

In some embodiments, the field device 102 includes field device circuitry 122 that performs conventional field device tasks such as process parameter monitoring and measurements, and/or process control operations. In one example, the field device circuitry 122 may comprise a device controller 124, an active component 126 in the form of one or more sensors 126A and/or control devices 126B, and measurement or control circuitry 128, as shown in the simplified diagram of FIG. 2. The field device circuitry 122 may take the form of conventional field device circuitry.

The one or more sensors 126A may comprise a process sensor that is used to measure a parameter of the process 108, such as a temperature, a level, a pressure, a flow rate, or another parameter of the process 108. Thus, the one or more sensors 126A may include a pressure sensor, a temperature sensor, a level sensor, a flow rate sensor, and/or another sensor used to sense or measure a process parameter.

The control device or devices 126B may be configured to control an aspect of the process 108. Examples of such control devices 126B include actuators, solenoids, valves, and other conventional process control devices used in field devices to control an aspect of an industrial process.

The measurement or control circuitry 128 may represent conventional circuitry that interacts with the sensor 126A or the control device 126B. For instance, the measurement or control circuitry 128 may include measurement circuitry (e.g., analog-to-digital converter, amplifiers, etc.) that translates an output from a sensor 126A for use by the device controller 124, or translates a control signal from the device controller 124 that controls the control device 126B, such as in response to a command received from the control unit 104.

The device controller 124 may communicate data to the control unit 104, such as data sensed by the sensor 126A, and/or receive data from the control unit 104, such as control commands for the control device 126B, using the APL communication circuit 112. Such data may be communicated using conventional data communication protocols, such as HART®, Modbus, PROFIBUS, Foundation™ Fieldbus, IO-Link, and/or another suitable communication protocol implemented using conventional APL communication circuits 112.

The APL communication circuit 112 generally includes a media access controller (MAC) and physical interface transceiver (PHY) circuit 130 (hereinafter "MAC PHY circuit") and an APL controller 132, in accordance with conventional APL communication circuits 112. The MAC PHY circuit 130 generally defines the physical and electrical characteristics of the network, has a unique address, and is configured to send and receive data packets. The APL controller 132 (e.g., master control unit) is configured to process signals and data packets received by the MAC PHY circuit 130. Thus, for example, the APL communication circuit 112 may receive data (e.g., sensor signal or value) from the device controller 124, process the data, and communicate corresponding data packets to the control unit 104 using the MAC PHY circuit 130, and/or receive a data packet from the control unit 104 using the MAC PHY circuit 130, and process the data packet for further processing by the device controller 124, such as to control a control device 126B.

The APL spur 120 provides significantly higher power (e.g., 500 mW) to the field device 102 as compared to that supplied over legacy 4-20 mA control loops. For some field devices 102, the received power is significantly greater than that required to operate the APL communication circuit 112 and field device circuitry 122. A power circuit 134 of the field device 102 operates to control the power supplied to the APL communication circuit 112 and field device circuitry 122 by the APL spur 120 through terminals 136 and 138, and divert excess power to a circuit common.

Figure 3:
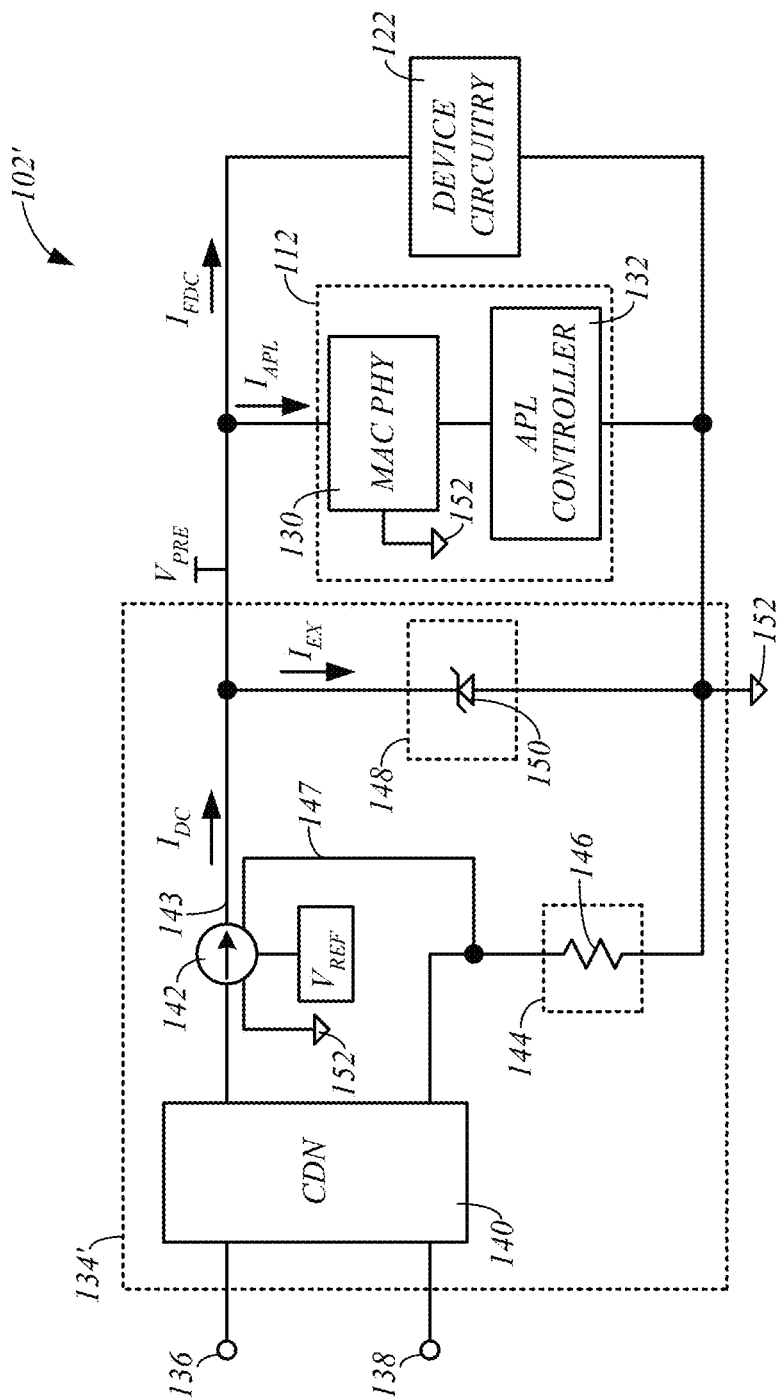
FIG. 3 is a simplified circuit diagram of a field device including a power circuit, in accordance with the prior art.

FIG. 3 is a simplified circuit diagram of a field device 102' having a power circuit 134', in accordance with the prior art. The power circuit 134' generally includes a coupling-decoupling network (CDN) 140 that splits the incoming signals through the terminals 136 and 138 into direct current (DC) power for the APL communication circuit 112 and the field device circuitry 122, and digital communications going to the MAC PHY circuit 130.

The DC power to the APL communication circuit 112 and the field device circuitry 122 is controlled by a fixed current source regulator 142 that outputs a DC current $I_{DC}$ at a voltage $V_{PRE}$ on a positive DC bus 143 such that a minimum voltage across the terminals 136 and 138 is maintained. A main current sensor 144 operates to sense the current $I_{DC}$ using a sense resistor 146. A main current signal 147, which corresponds to a voltage drop across the resistor 146, is used as feedback relative to a reference voltage $V_{REF}$ to fix the DC current $I_{DC}$.

Due to the excess power supplied to the field device 102, the DC current $I_{DC}$ is greater than the sum of the currents used to power the APL communication circuit 112 ($I_{APL}$) and the field device circuitry 122 ($I_{FDC}$). The power circuit 134' includes a voltage shunt regulator 148, which may include a Zener diode 150, through which the unused excess current $I_{EX}$ ($I_{EX}=I_{DC}-I_{APL}-I_{FDC}$) is routed to the circuit common 152.

In one example, the power circuit 134' may generate a DC current $I_{DC}$ of 50 mA. The current $I_{APL}$ supplied to the APL communication circuit 112 may be approximately 25 mA and the current $I_{FDC}$ supplied to the field device circuitry 122 may be approximately 6.7 mA. As a result, the excess current $I_{EX}$ that is diverted to the circuit common 152 through the voltage shunt regulator 148 is approximately 18.3 mA, which corresponds to about 110 mW of power that is wasted to the circuit common 152.

Figure 4:
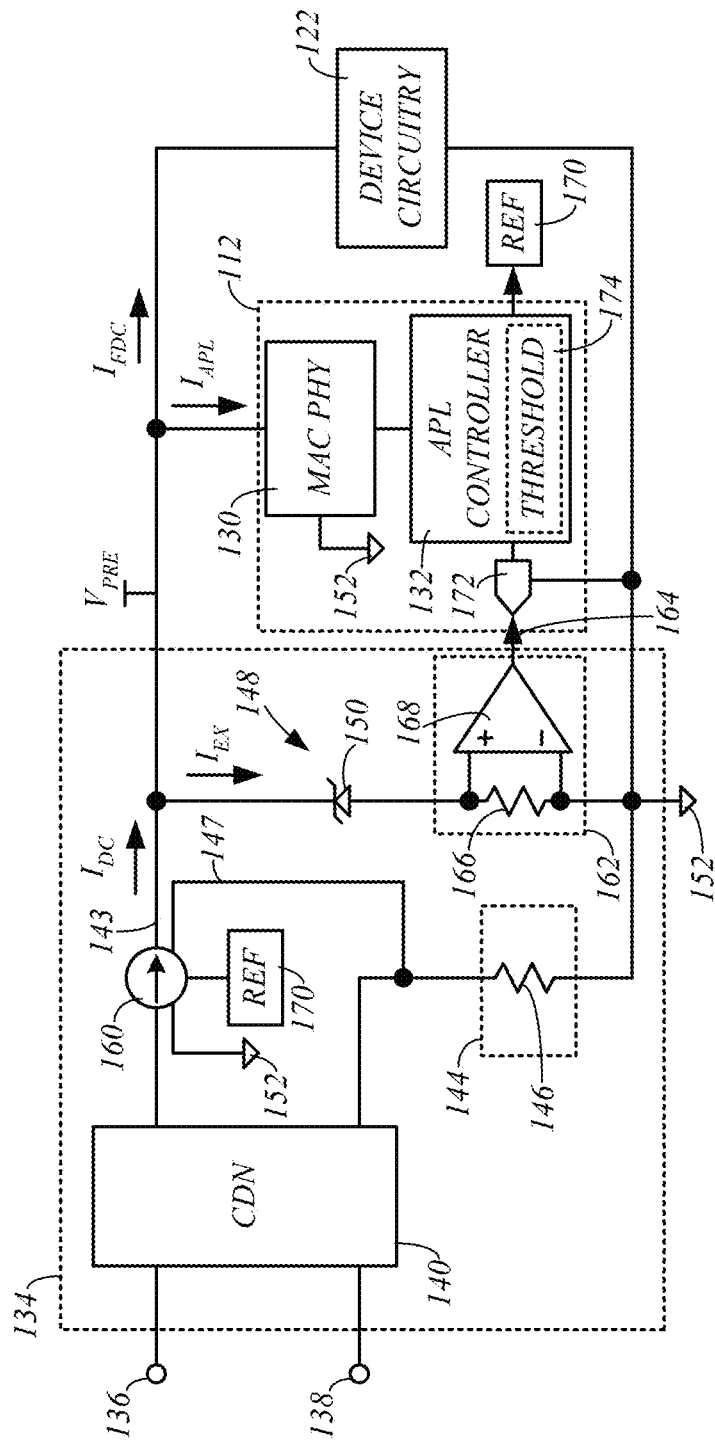
FIG. 4 is a simplified circuit diagram of a field device including a power circuit, in accordance with the present disclosure.

Embodiments of the present disclosure relate to a power circuit 134 that is configured to significantly improve the energy efficiency of the field device 102 by reducing power waste. FIG. 4 is a simplified circuit diagram of a field device 102 comprising the power circuit 134, in accordance with embodiments of the present disclosure.

The power circuit 134 operates similarly to the power circuit 134' (FIG. 3) by supplying the DC power (e.g., current $I_{DC}$) that powers the APL communication circuit 112 ($I_{APL}$) and the device circuitry ($I_{FDC}$), and includes a CDN 140 connected to the terminals 136 and 138. However, the power circuit 134 operates to detect the excess power ($I_{EX}$) that is unused by the device circuitry 122 and the APL communication circuit 112, and adjust the DC power to reduce or minimize the excess power diverted to the circuit common 152. As a result, the field device 102 reduces the amount of energy that is wasted to the circuit common 152 relative to the prior art field device 102'.

The power circuit 134 includes a power regulator 160 that replaces the fixed current source regulator 142 of the prior art field device 102', and an excess power sensor 162 that generates an excess power signal 164 that corresponds to the excess power (e.g., $I_{EX}$) conducted through the voltage shunt regulator 148. The power regulator 160 adjusts the DC power (e.g., $I_{DC}$) based on the main power signal 147 from the main power sensor 144 and the excess power signal 164, to minimize the amplitude of the excess power while maintaining a desired minimum voltage across the terminals 136 and 138, and providing the power (e.g., $I_{APL}$ and $I_{FDC}$) that meets the operating requirements of the APL communication circuit 112 and the field device circuitry 122.

One example of the power regulator 160 comprises a variable current source regulator that is configured to adjust the DC power by adjusting the DC current $I_{DC}$. One example of the main power sensor 144 includes a sense resistor 146 that produces the main power signal 147 that is indicative of the current $I_{DC}$ in the form of a voltage drop across the resistor 146. The main power or main current signal 147 may be used as feedback to the variable current source regulator 160.

The excess power sensor 162 may take on any suitable form. In one example, the excess power sensor 162 is in the form of an excess current sensor that comprises a sense resistor 166 placed in series with the voltage shunt regulator 148. The excess power signal 164 may take the form of an excess current signal that comprises a voltage across the sense resistor 166. In one embodiment, the excess current signal 164 may be amplified using any suitable technique, such as a circuit comprising an operational amplifier (op amp) 168, as indicated in FIG. 4.

In one embodiment, the variable current source regulator 160 adjusts the DC current $I_{DC}$ based on the main current signal 147 and a reference signal 170, which corresponds to the excess current signal 164 and, thus, the excess current $I_{EX}$. Accordingly, in some embodiments, the excess current signal, with or without additional processing, is provided to the variable current source regulator 160 as the reference signal 170.

In another embodiment, the reference signal 170 is generated by the APL communication circuit 112 based on the magnitude of the excess current $I_{EX}$ or the excess current signal 164. In one example, the APL communication circuit 112 includes an analog-to-digital converter (ADC) 172 that converts the excess current signal 164 into a digital value and the APL controller 132 generates the reference signal 170 based on the digital value, as indicated in FIG. 4.

The reference signal 170 may be provided to the variable current source regulator 160 in any suitable form or manner. For example, the reference signal 170 may be conveyed to the variable current source regulator 160 through a controlled resistor or controlled voltage method, in which the reference signal 170 is generated in response to a pulse-width modulated voltage passed through a low-pass filter, or the reference signal 170 may be conveyed to the variable current source regulator 160 using another suitable technique.

In some embodiments, the APL controller 132 operates to ensure that the variable current source regulator 160 maintains the required currents $I_{APL}$ and $I_{FDC}$ for operation of the APL communication circuit 112 and the field device circuitry 122, and the minimum voltage drop across the terminals 136 and 138. In one example, the reference signal 170 is dependent on a relationship between an excess current value corresponding to a magnitude of the excess current $I_{EX}$ to a threshold value 174, which may be stored in memory of the APL controller 132, for example. The excess current value may, for example, correspond to the digital value of the excess current signal 164 output from the ADC 172.

When the excess current value meets a first relationship to the threshold value 174, the reference signal 170 is set to directly correspond to the excess current value. When the excess current value meets a second relationship to the threshold value 174, the reference signal 170 is set to correspond to a predefined minimum value that maintains the minimum voltage across the terminals 136 and 138 and the operation of the APL communication circuit 112 and the field device circuitry 122.

For example, the threshold value 174 may represent a minimum value for the reference signal 170 that maintains the minimum voltage between the terminals and the minimum operating currents for the APL communication circuit 112 and the device circuitry. When the excess current value is greater than the threshold value 174, the APL controller 132 generates a reference signal 170 that corresponds to the excess current value. When the excess current value is less than the threshold value 174, the APL controller 132 generates a reference signal 170 that corresponds to the predetermined minimum value. Other relationships between the excess current value and the threshold value 174 may also be used depending on the configuration of the field device 102.

Figure 5:
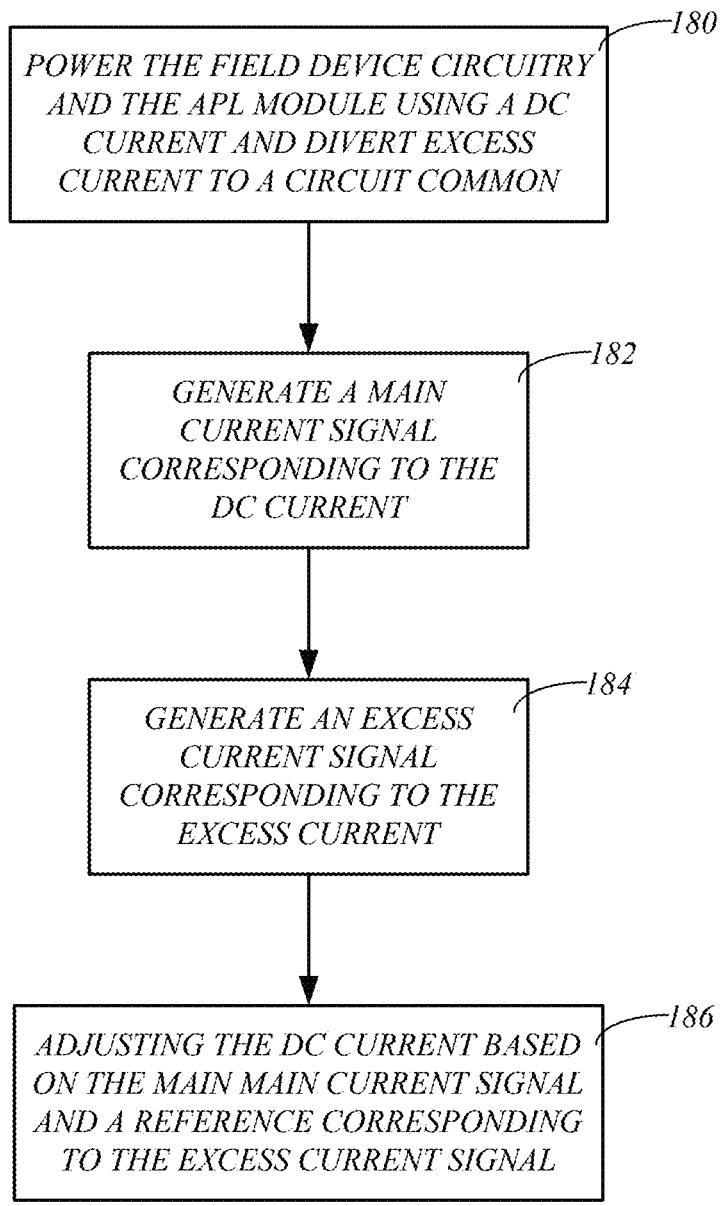
FIG. 5 is a flowchart illustrating an example of a method of managing power in a field device, in accordance with embodiments of the present disclosure.

FIG. 5 is a flowchart illustrating an example of a method of managing power in a field device, in accordance with embodiments of the present disclosure. In one embodiment, the field device 102 includes one or more features described above. Thus, the field device 102 may include the field device circuitry 122, the APL communication circuit 112 and the power circuit 134, each formed in accordance with one or more embodiments described herein.

At 180 of the method, the field device circuitry 122 and the APL communication circuit 112 is powered using DC power (e.g., DC current $I_{DC}$), and excess power (e.g., $I_{EX}$) is diverted to the circuit common 152, such as through the voltage shunt regulator 148. A main power sensor 144 generates a main power signal 147 that corresponds to the DC power at 182. At 184, an excess power sensor 162 generates an excess power signal 164 that corresponds to the excess power. At 186, the power regulator 160 adjusts the DC power based on the main power signal 147 and a reference signal 170 corresponding to the excess power signal 164.

In one embodiment, the APL communication circuit 112 includes the ADC 172 and the APL controller 132. In the method, the excess power signal 164 is converted into a digital value using the ADC 172, and the APL controller 132 generates the reference signal 170 based on the digital value. As discussed above, the APL controller 132 may compare the digital value to a threshold value 174 and generate the reference signal 170 based on the comparison. For example, as discussed above, the generated reference signal 170 may correspond to the digital value when the digital value meets a first relationship to the threshold value 174, and the generated reference signal 170 may correspond to a predefined minimum value when the digital value meets a second relationship to the threshold value 174.

Figure 6:
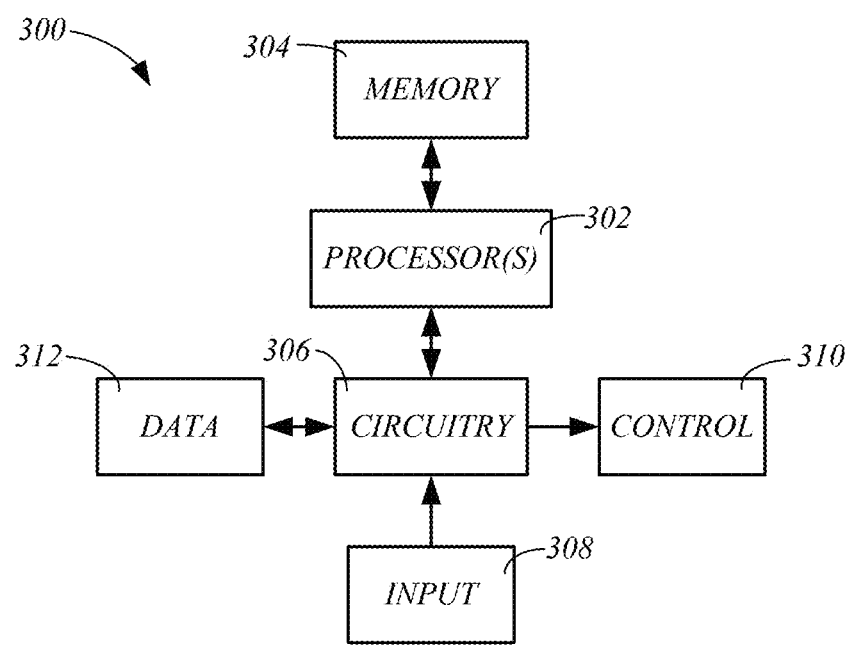
FIG. 6 is simplified circuit diagram of an example of a controller, in accordance with embodiments of the present disclosure.

While functions described herein may be disclosed as being performed by a single controller (e.g., device controller 124 or APL controller 132), it is understood that the functions may be performed by a single controller or multiple controllers. Each of the controllers described herein may take on any suitable patent-eligible form, such as that of the example controller 300 shown in FIG. 6.

The controller 300 may include one or more processors 302 and memory 304, which may be local memory and/or memory that is accessible to the controller 300. The one or more processors 302 are configured to perform various functions described herein in response to the execution of instructions contained in the memory 304, such as a test program, for example.

The one or more processors 302 may be components of one or more computer-based systems, and may include one or more control circuits, microprocessor-based engine control systems, and/or one or more programmable hardware components, such as a field programmable gate array (FPGA). The memory 304 represents local and/or remote memory or computer-readable media. As used herein, such memory 304 comprises any suitable patent subject matter eligible computer-readable media and does not include transitory waves or signals. Examples of the memory 304 include conventional data storage devices, such as hard disks, CD-ROMs, optical storage devices, magnetic storage devices and/or other suitable data storage devices.

The controller 300 may include circuitry 306 for use by the one or more processors 302 to receive input signals 308 (e.g., sensor signals), issue control signals 310 (e.g., power switch control signals) and/or communicate data 312, such as in response to the execution of the instructions stored in the memory 304 by the one or more processors 302.

Although the embodiments of the present disclosure have been described with reference to preferred embodiments, workers skilled in the art will recognize that changes may be made in form and detail without departing from the spirit and scope of the present disclosure.

What is claimed is:

1. A field device for an industrial process comprising:
    field device circuitry;
    an Ethernet communications in advance physical layer communication circuit (APL communication circuit); and
    a power circuit comprising:
        a power regulator configured to regulate DC power that powers the field device circuitry and the APL communication circuit;
        a main power sensor configured to generate a main power signal that corresponds to the DC power;
        a voltage shunt regulator configured to divert excess power to a circuit common; and
        an excess power sensor configured to generate an excess power signal that corresponds to a magnitude of the excess power,
    wherein the power regulator adjusts the DC power based on the main power signal and the excess power signal.

2. The field device according to claim 1, wherein:
    the power regulator comprises a variable current source regulator configured to regulate a DC current of the DC power;
    the main power sensor comprises a main current sensor configured to generate the main power signal, which corresponds to the DC current;
    the excess power comprises an excess current; and
    the excess power sensor comprises an excess current sensor configured to generate the excess power signal, which corresponds to a magnitude of the excess current,
    wherein the variable current source regulator adjusts the DC current based on the main power signal and the excess power signal.

3. The field device according to claim 2, wherein the APL communication circuit comprises:
    an analog-to-digital converter configured to convert the excess power signal to a digital value; and
    an APL controller configured to generate a reference signal based on the digital value,
    wherein the variable current source regulator controls the DC current based on the reference signal.

4. The field device according to claim 3, wherein the excess current sensor comprises a sense resistor in series with the excess current, and the excess power signal comprises a voltage.

5. The field device according to claim 4, wherein the main current sensor comprises a sense resistor in series with the DC current, and the main power signal comprises a voltage.

6. The field device according to claim 3, wherein:
    the APL controller is configured to compare the digital value to a threshold value;
    the reference signal corresponds to the digital value when the digital value meets a first relationship to the threshold value; and
    the reference signal corresponds to a predefined minimum value, which is different from the digital value, when the digital value meets a second relationship to the threshold value.

7. The field device according to claim 2, wherein:
    the power circuit includes a coupling-decoupling network comprising positive and negative terminals, through which the DC current is received;
    the variable current source regulator is connected in series with the positive and negative terminals; and
    the field device circuitry and the APL communication circuit are connected in parallel with the positive and negative terminals.

8. The field device according to claim 2, wherein the field device circuitry comprises an active component selected from the group consisting of a sensor configured to sense a process parameter and a control device configured to control a process of the industrial process.

9. The field device according to claim 2, wherein:
the field device circuitry is powered by a first portion of the DC current;
the APL communication circuit is powered by a second portion of the DC current; and
the excess current corresponds to a difference between the DC current and the sum of the first and second portions of the DC current.

10. A field device for an industrial process comprising:
a power circuit comprising:
  a power regulator configured to regulate a DC power conducted through a positive DC bus;
  a main power sensor configured to generate a main power signal that corresponds to the DC power;
  a voltage shunt regulator configured to divert excess power from the positive DC bus to a circuit common; and
  an excess power sensor configured to generate an excess power signal that corresponds to a magnitude of the excess power;
field device circuitry powered by a first portion of the DC power; and
an Ethernet communications in advance physical layer communication circuit (APL communication circuit) powered by a second portion of the DC power and comprising:
  an analog-to-digital converter configured to convert the excess power signal to a digital value; and
  an APL controller configured to generate a reference signal based on the digital value,
wherein:
  the reference signal corresponds to an excess power value corresponding to the excess power signal when the excess power value meets a first relationship to a threshold value;
  the reference signal corresponds to a predefined minimum value, which is different from the excess power value, when the excess power value meets a second relationship to the threshold value; and
  the power regulator controls the DC power based on the reference signal and the main power signal.

11. The field device according to claim 10, wherein:
the power regulator comprises a variable current source regulator configured to regulate a DC current of the DC power;
the main power sensor comprises a main current sensor configured to generate the main power signal, which corresponds to the DC current;
the excess power comprises an excess current; and
the excess power sensor comprises an excess current sensor configured to generate the excess power signal, which corresponds to a magnitude of the excess current,
wherein:
  the reference signal corresponds to an excess current value corresponding to the excess power signal when the excess current value meets a first relationship to a threshold value;
  the reference signal corresponds to a predefined minimum value, which is different from the excess current value, when the excess current value meets a second relationship to the threshold value; and
  the variable current source regulator controls the DC current based on the reference signal and the main power signal.

12. The field device according to claim 11, wherein:
the APL communication circuit comprises an analog-to-digital converter that converts the excess power signal to a digital value corresponding to the excess current value; and
the APL communication circuit generates the reference signal based on a comparison of the digital value to the threshold value.

13. The field device according to claim 11, wherein:
the excess current sensor comprises a sense resistor in series with the excess current, and the excess power signal comprises a voltage; and
the main current sensor comprises a sense resistor in series with the DC current, and the main power signal comprises a voltage.

14. The field device according to claim 11, wherein the field device circuitry and the APL communication circuit are connected in parallel between the positive DC bus and the circuit common.

15. The field device according to claim 14, wherein:
the power circuit includes a coupling-decoupling network comprising positive and negative terminals, through which the DC current is received; and
the variable current source regulator is connected in series with the positive and negative terminals.

16. The field device according to claim 10, wherein the field device circuitry comprises an active component selected from the group consisting of a sensor configured to sense a process parameter and a control device configured to control a process of the industrial process.

17. The field device according to claim 10, wherein:
the field device circuitry is powered by a first portion of the DC current;
the APL communication circuit is powered by a second portion of the DC current; and
the excess current corresponds to a difference between the DC current and the sum of the first and second portions of the DC current.

18. A method of managing power in an industrial process field device comprising:
field device circuitry;
an Ethernet communications in advance physical layer communication circuit (APL communication circuit); and
a power circuit comprising:
  a power regulator;
  a voltage shunt regulator;
  a main power sensor; and
  an excess power sensor,
the method comprising:
  powering the field device circuitry and the APL communication circuit using DC power;
  diverting excess power of the DC power to a circuit common using the voltage shunt regulator;
  generating a main power signal that corresponds to the DC power using the main power sensor;
  generating an excess power signal that corresponds to the excess power using the excess power sensor; and
  adjusting the DC power using the power regulator based on the main power signal and a reference corresponding to the excess power signal.

19. The method according to claim 18, wherein:
the APL communication circuit comprises:
- an analog-to-digital converter; and
- an APL controller; and the method comprises:
- converting the excess power signal into a digital value using the analog-to-digital converter;
- generating the reference based on the digital value using the APL controller.

20. The method according to claim 19, wherein:
generating the reference comprises:
- comparing the digital value to a threshold value using the APL controller; and
- generating the reference signal based on the comparison;

the reference signal corresponds to the digital value when the digital value meets a first relationship to the threshold value; and the reference signal corresponds to a predefined minimum value, which is different from the digital value, when the digital value meets a second relationship to the threshold value.

* * * * *